Fig. 2

INVENTOR
JERRY F. SCHARF

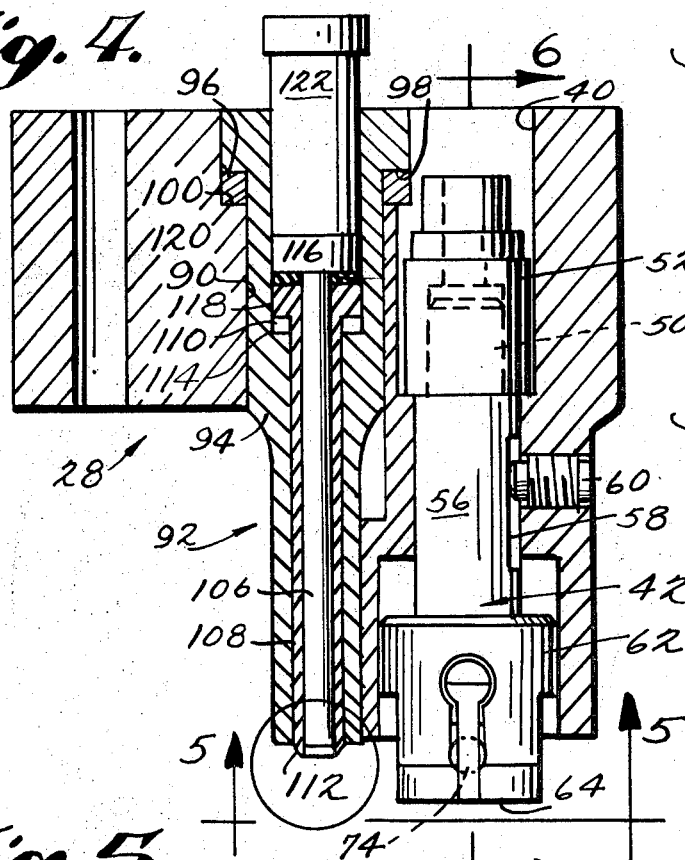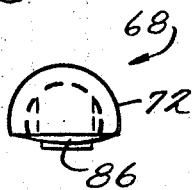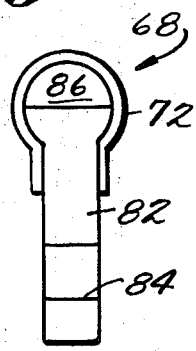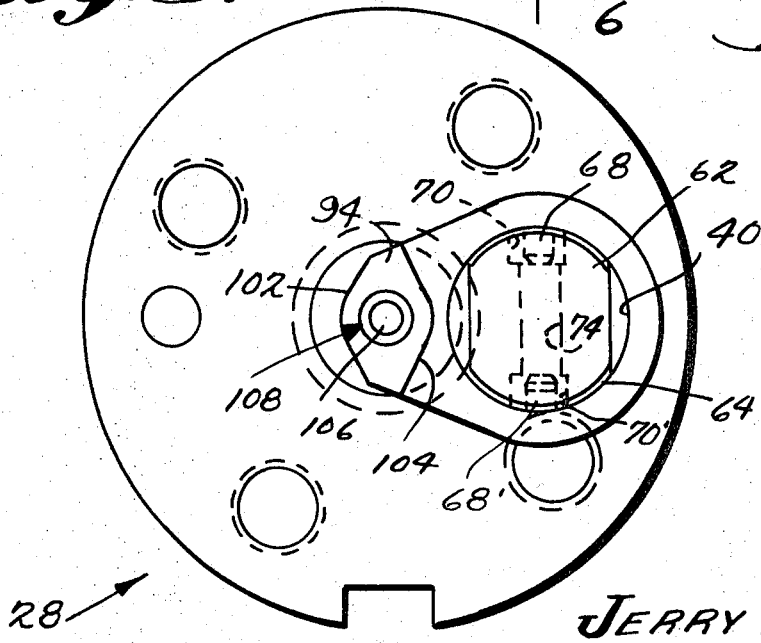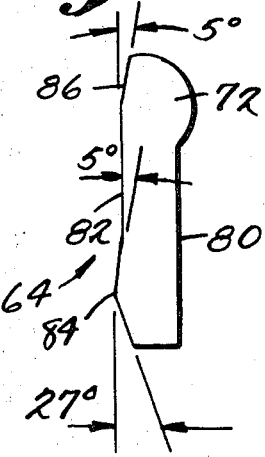

INVENTOR
JERRY F. SCHARF

BY Cushman Darby & Cushman
ATTORNEYS

Jan. 26, 1971 J. F. SCHARF 3,557,425
RING TAB ASSEMBLY OPERATION
Filed Oct. 15, 1968 6 Sheets-Sheet 6

INVENTOR
JERRY F. SCHARF
BY Cushman, Darby & Cushman
ATTORNEYS

United States Patent Office 3,557,425
Patented Jan. 26, 1971

3,557,425
RING TAB ASSEMBLY OPERATION
Jerry F. Scharf, Havertown, Pa., assignor to Crown Cork & Seal Company, Inc., Philadelphia, Pa., a corporation of New York
Filed Oct. 15, 1968, Ser. No. 767,743
Int. Cl. B23p 19/00, 19/04
U.S. Cl. 29—200                         32 Claims

ABSTRACT OF THE DISCLOSURE

A pre-staking station in a press for pre-staking ring tabs to an end closure is provided with a mechanical holding and aligning device for gripping a ring tab blank as it is fed into the station on a feed strip, severing the ring tab blank from the feed strip, and positioning the ring tab blank in relation to an end closure so that the ring tab blank can be pre-staked to the end closure by means of a punch assembly located at the station. The mechanical holding and aligning device comprises a ring pilot with spring-biased fingers that grip the ring tab blank to retain the blank on the ring pilot until the blank is pre-staked to the end closure or a spring-loaded staking punch and ring pilot (no spring-biased fingers required) which protrude through the aperture in the blank for the rivet and the ring portion of the blank respectively. As the ring tab blank is pre-staked to the end closure, in the first form of the invention, the pilot is depressed into its housing causing the fingers of the pilot to disengage the blank and release the ring pilot from the ring tab blank. In the modified form of the invention, the spring-loaded staking punch and ring pilot are both depressed into their housing to effect their release from the blank. A second set of spring-biased fingers on a blanking insert assembly temporarily grip the ring tab blank as the ring pilot is initially inserted through the blank.

BRIEF DESCRIPTION OF THE INVENTION

This invention relates to the ring tab assembly operation and, more particularly, to a mechanical holding device used in a pre-staking or similar operation for positioning and holding a ring tab blank relative to an end closure so that the ring tab blank can be pre-staked to the end closure.

Heretofore, a vacuum system has been utilized to centralize and hold ring tab blanks in position during a pre-staking operation. However, major difficulties have resulted with the use of the vacuum system in the pre-staking station causing excessive spoilage, jamming and tool breakage during the pre-staking operation.

One difficulty encountered has been the application of a vacuum to the ring tab blanks because of an accumulation in the vacuum system of slivers or shavings from the blanking operations. Due to this and other difficulties, frequent interruptions in production are necessary to maintain the vacuum system. In addition, problems have resulted from the ineffectiveness of the vacuum system to properly position the ring tab blanks for the pre-staking operation.

It is one of the subjects of the present invention to considerably improve the operation of the pre-stake station through the use of a centralization compensational holding device which eliminates the above-mentioned problems. In addition to the better centralization and holding of the ring tabs, the mechanical holding device of the present invention greatly reduces the maintenance time required to keep the system in operation when compared to the time requird to maintain the vacuum system.

Briefly, the present invention comprises a ring pilot assembly carried by the upper die of a press at the pre-staking station in a ring tab assembly operation and a blanking insert assembly, intermediate the upper and lower dies, through which the feed strip carrying the ring tab blanks is fed and which temporarily maintains the ring tab blanks in a proper position so that the blanks can be gripped by the ring pilot and positioned on the surface of an end closure for pre-staking. The ring pilot is housed partially within a sleeve and is usually cylindrical in form having an external diameter substantially equal to the internal diameter of a ring tab blank. However, ring pilots with semi-round and oddly shaped forms can be applied.

In one form, the spring-loaded ring pilot is provided with a pair of diametrically opposed spring-biased fingers which normally protrude beyond the sidewall of the ring pilot to thereby frictionally engage and retain a ring tab blank on the ring pilot while the blank is positioned on and pre-staked to an end closure. As a ring tab blank is being pre-staked to an end closure, the ring pilot is forced up into the sleeve thereby forcing the spring-biased fingers inwardly releasing the ring pilot from the ring tab.

In the modified form of the invention, a spring-loaded ring pilot can be employed, with or without the pair of diametrically-opposed spring-biased fingers, in conjunction with a spring-loaded staking punch. The ring pilot is housed partially within a sleeve and is usually cylindrical in form having external dimensions substantially equal to the internal dimensions of the ring portion in the ring tab blank. However, ring pilots with semi-round and oddly shaped configurations can be utilized. The ring pilot and the staking punch both normally protrude beyond the lower end face of the pre-stake punch and ring pilot housing. During the blanking and positioning of the ring tab blank, the ring pilot extends through the aperture in the ring portion of the blank while the staking punch protrudes through the aperture provided in the blank for the rivet. As the ring tab blank is being pre-staked to the end closure, the ring pilot and staking punch are forced up into the housing by the end closure thereby releasing the ring pilot and staking punch from the ring tab which is affixed to the end closure.

The blanking insert cutting die has a central aperture therein corresponding in configuration to the outer configuration of the ring tab blanks but having greater dimensions than the ring tab blanks. A pair of diametrically-opposed spring-biased fingers protrude inwardly beyond the sidewall of the aperture to initially engage the outer periphery of the ring tab blank as the ring pilot is inserted through the ring tab. As the pilot passes down through the blanking insert assembly, the spring-biased fingers on the insert assembly are forced out of the way thereby allowing the ring pilot and ring tab to pass down through the blanking insert assembly to a point where the ring tab is properly positioned on the surface of an end closure for the pre-staking operation.

After the ring tab has been properly located for the pre-staking operation, the punches on the upper and lower dies pre-stake the ring tab to the end closure and the ring pilot and upper die are withdrawn to their original position. In one form of the invention, since the ring tab is affixed to the end closure and the spring-biased fingers on the ring pilot have been forced inwardly by the movement of the pilot up into its housing, the ring tab slides off the spring-biased fingers of the ring pilot as the ring pilot is withdrawn to its uppermost position thereby leaving the ring tab affixed to the end closure. In the other form of the invention, the ring tab blank slides off the staking punch and the ring pilot as the the staking punch and ring pilot are forced into their housing thereby leaving the ring tab affixed to the end closure. The conveyor systems carrying the ring tab blanks and the end closures are then indexed to bring a new end closure and ring tab blank into position and the operation is repeated.

The above objects and advantages of the present invention will become more apparent and other objects and advantages will become apparent from the following detailed description when taken in conjunction with the accompanying drawings in which:

FIG. 2 is a sectional view through the upper and lower dies and the intermediate blanking insert assembly showing the upper die part way through its downward stroke with the spring-biased fingers of the ring pilot engaging the ring tab blank;

FIG. 4 is an enlarged sectional view of the pre-stake punch and ring pilot assembly;

FIG. 5 is a view taken substantially along lines 5—5 of FIG. 4 showing an end view of the pre-stake punch and ring pilot assembly;

FIG. 7 is a top plan view of a finger utilized in the ring pilot;

FIG. 8 is a view of an outer surface of a finger utilized in the ring pilot;

FIG. 9 is a side view of a finger utilized in the ring pilot;

Figure 14:
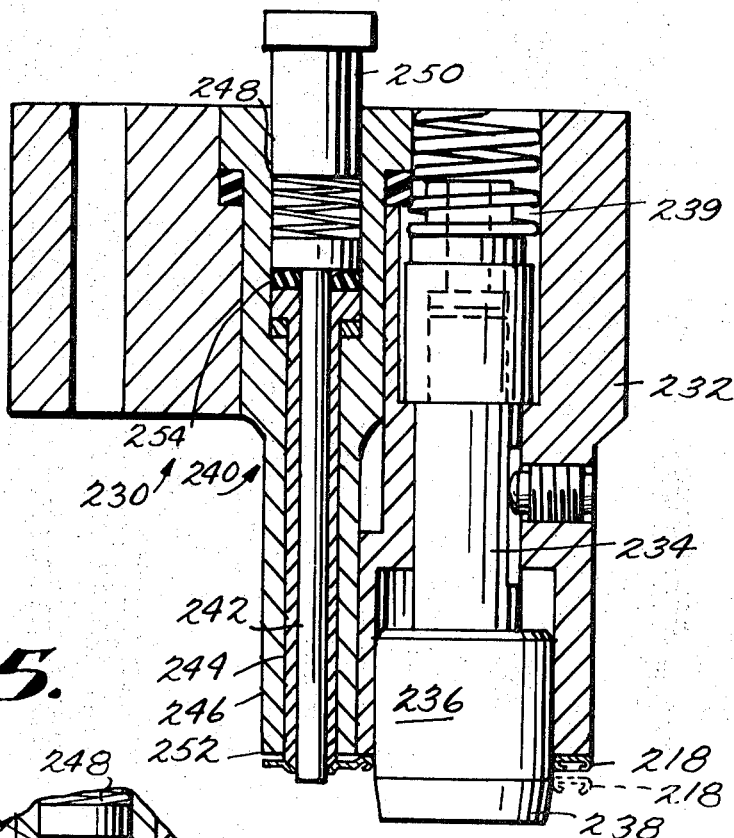
Figure 15:
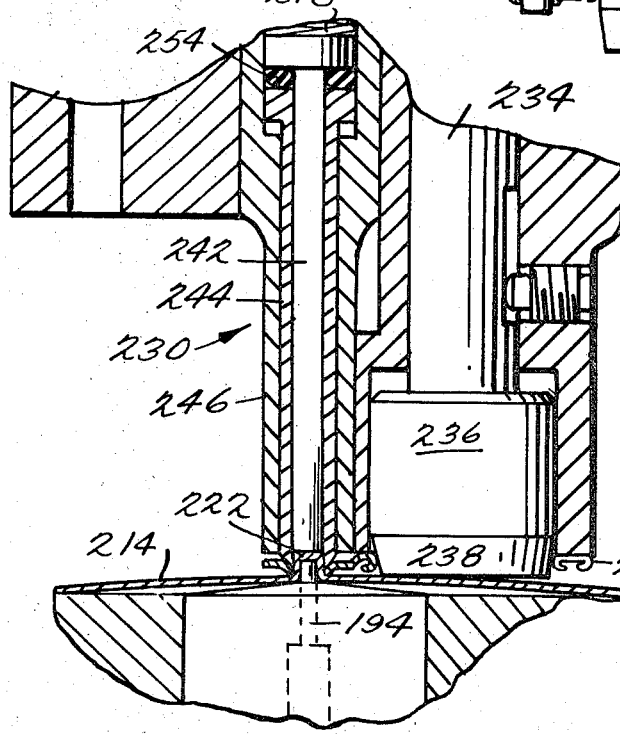
Figure 16:
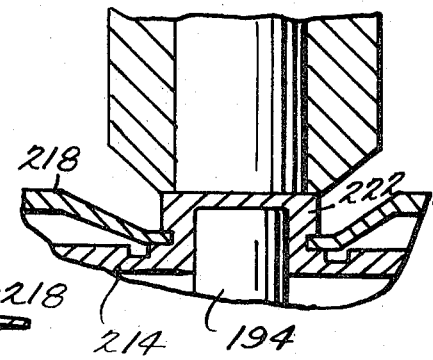

FIG. 14 is a sectional view of a modified form of the pre-stake punch and ring pilot assembly with a ring tab blank thereon and illustrating the initial deflected position (in phantom line) of the ring tab blank during the blanking of the ring tab blank from the strip of coil stock and the locked position (in solid line) of the ring tab blank for properly locating the ring tab blank for pre-staking to an end closure;

FIG. 15 is a sectional view of the lower portion of the modified pre-stake punch and ring pilot assembly of FIG. 14 illustrating the release of the upper pre-stake punch and ring pilot from the ring tab blank as the ring tab blank is pre-staked to an end closure; and FIG. 16 is a fragmentary sectional view of the upper pre-stake punch, the upper pre-stake punch bushing, the lower pre-stake punch, the end closure, and ring tab blank illustrating the ringtab blank pre-staked to the end closure and the relative positions of the assembly components for either form of the invention at the completion of the deformation of the end closure rivet.

DETAILED DESCRIPTION OF THE INVENTION

Figure 1:
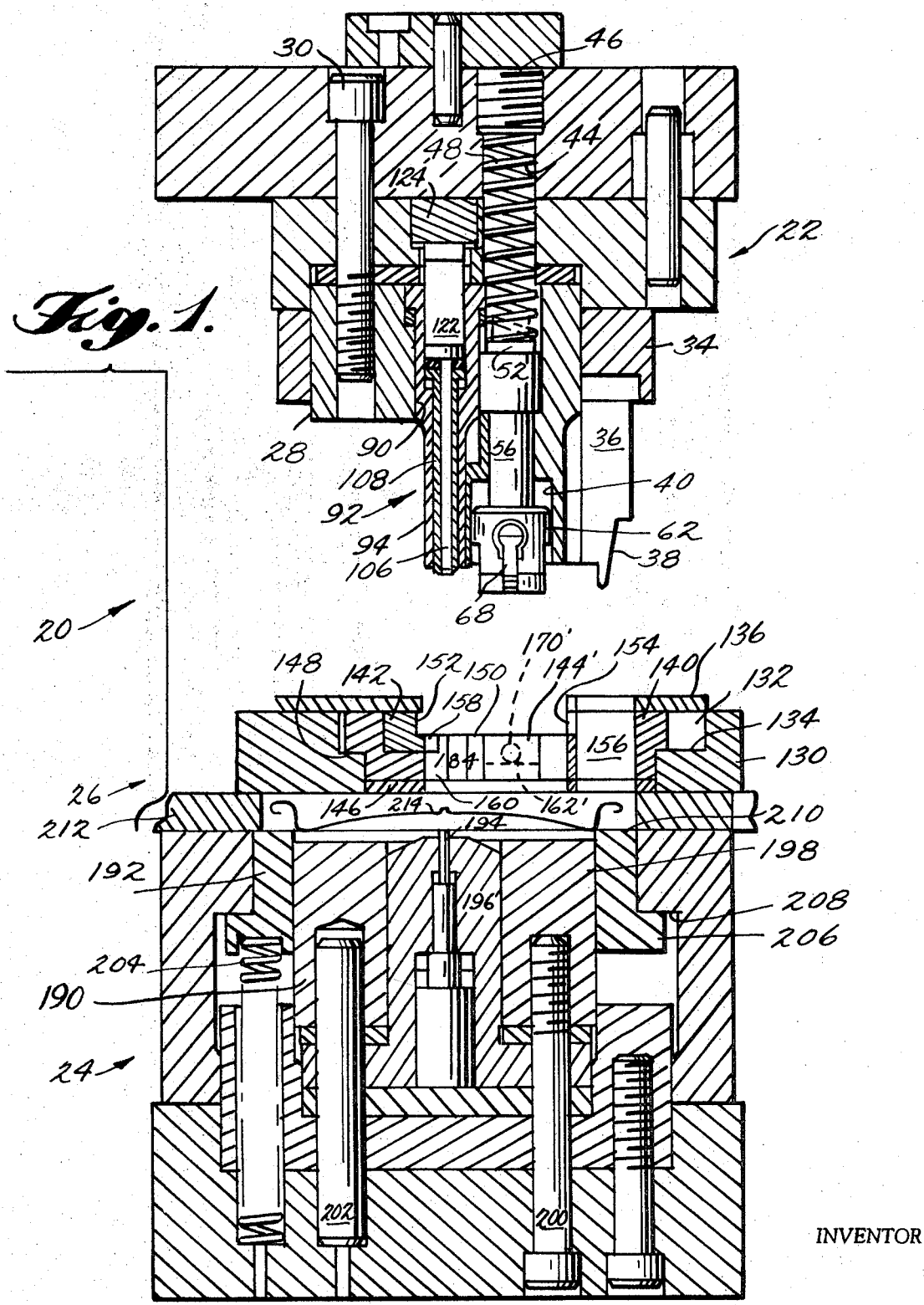
FIG. 1 is a sectional view taken through the upper and lower dies and the intermediate blanking insert assembly with the upper die in its retracted position.
Figure 2:
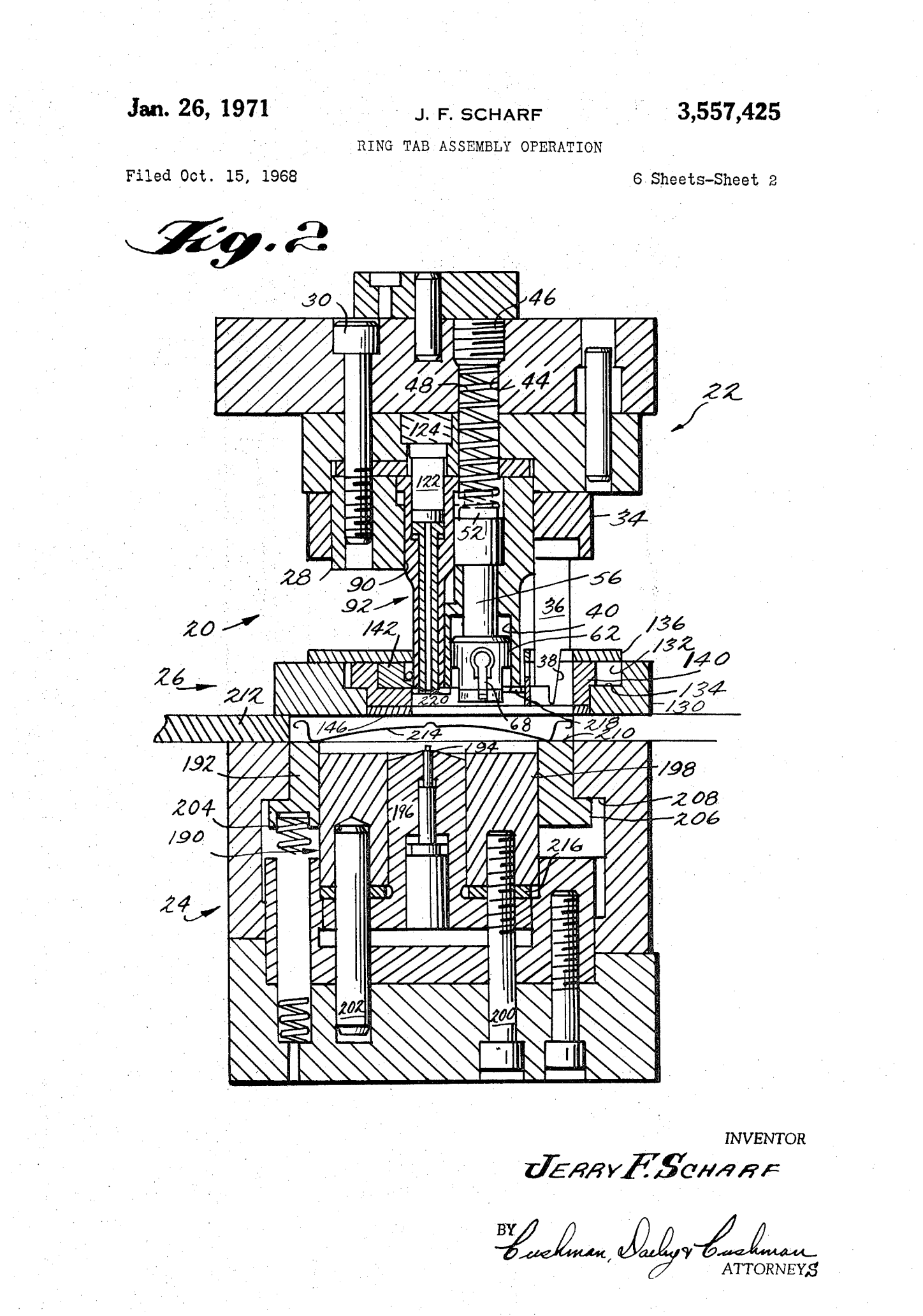
Figure 3:
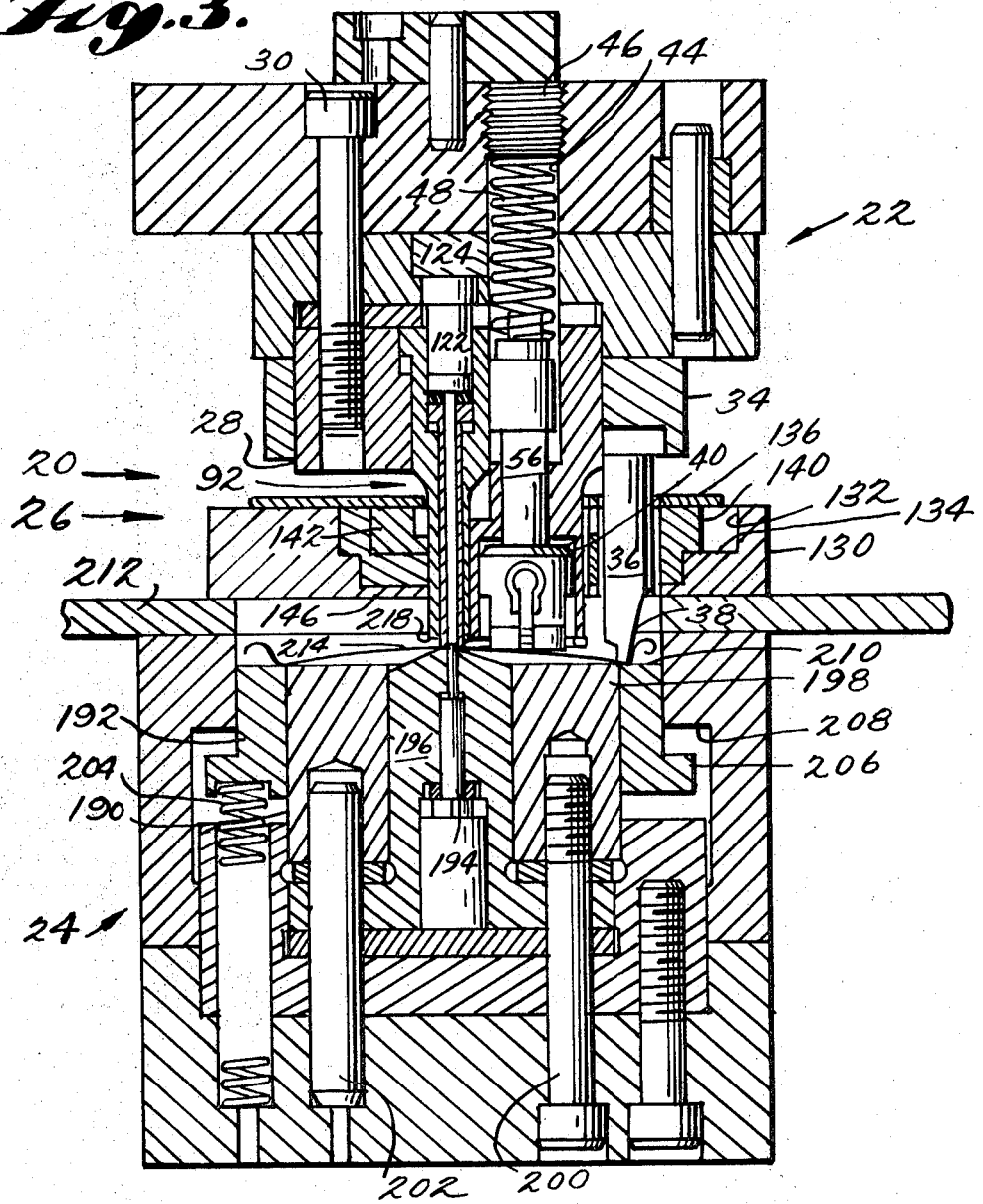
FIG. 3 is a sectional view through the upper and lower dies and the intermediate blanking insert assembly as the ring tab blank is being pre-staked to the end closure.
Figure 13:
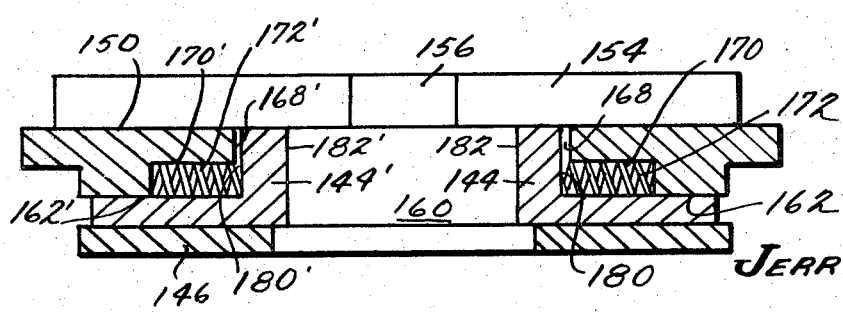
FIG. 13 is a sectional view of the intermediate blanking insert assembly substantially along lines 13—13 of FIG. 12.
Figure 6:
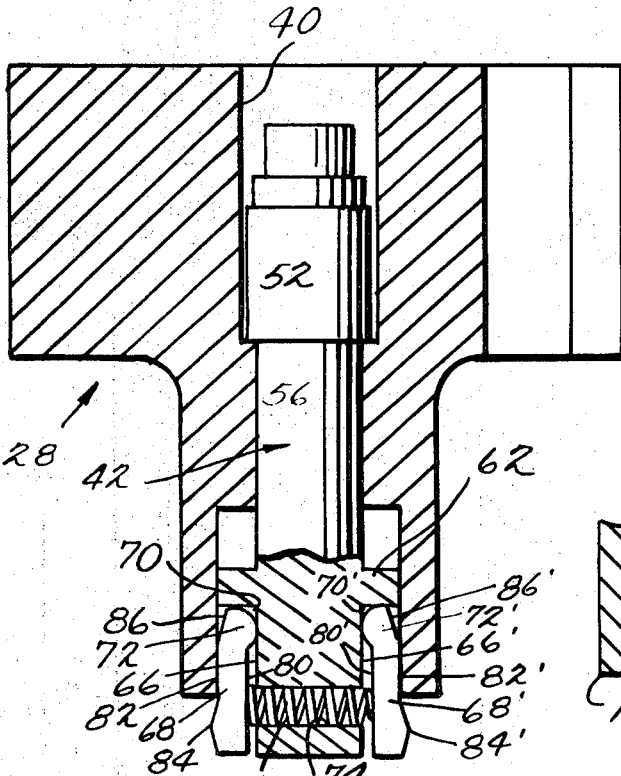
FIG. 6 is a sectional view of the pre-stake punch and ring pilot assembly substantially along lines 6—6 of FIG. 4 showing the ring pilot.
Figure 11:
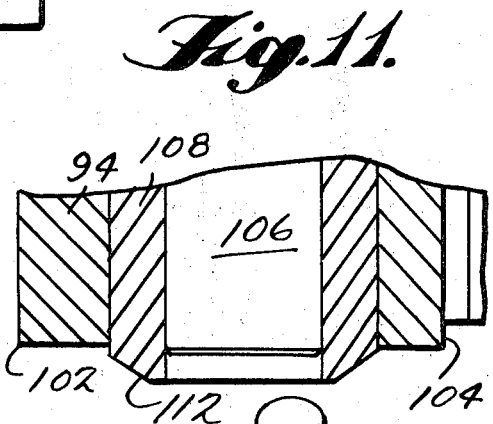
FIG. 11 is an enlarged view of the circled portion of FIG. 4 showing the lower portion of the upper pre-stake punch and the blank punch.

Referring now to the drawings and, in particular, to FIGS. 1 to 3, the press, indicated by reference numeral 20, comprises an upper die assembly 22, a lower die assembly 24 and an intermediate blanking insert assembly 26. The press can be any one of numerous presses such as a Stolle Hi-Speed Transfer Press or a Bliss C-45 Press.

At the pre-staking station of the press, the upped die assembly 22 is provided with a pre-stake punch and ring pilot holder 28 which is secured to the upper die assembly by bolt assemblies 30 or equivalent fastening means. The pre-stake punch and ring pilot holder 28 is encircled by an annular holder 34 on which are mounted a plurality of end closure or can top locators 36 for positioning and holding the end closures during the pre-staking operation. As with the pre-stake punch and ring pilot holder 28, holder 34 is secured to the upper die assembly 24 by bolt assemblies (not shown). In the preferred embodiment, at least three end closure locators 36 are retained on the annular element with the locators being spaced 120 degrees with respect to each other around the outer periphery of the pre-stake punch and ring pilot holder 28. The end closure locators 36 extend down below the pre-stake punch and ring pilot holder 28 and are provided with inclined surfaces 38 which flare outwardly from the lower free ends of the locators. The inclined surfaces of the locators engage the inner surface of the peripheral flange extending around the end closure and, due to the inclination of surfaces 38, the locators position and firmly retain the end closure in position as the upper die descends whereby the end closure is centered relative to the pre-stake punches during the pre-staking operation.

The pre-stake punch and ring pilot holder 28 has a vertically-extending cylindrical aperture 40 extending therethrough which houses the ring pilot 42. Aperture 40 has a waisted midporton which provides shoulders for limiting the vertical movement of the ring pilot 42 as will be fully explained hereinafter. When the pre-stake punch and ring pilot holder 28 is secured to the upper die assembly 22, the aperture 40 in the pre-stake punch and ring pilot holder 28 is aligned with a vertically-extending aperture 44 in the upper die assembly which has substantially the same diameter as the upper portion of aperture 40. Aperture 44 is threaded at its upper end and receives a threaded plug 46 which co-operates with a coil spring 48 housed within apertures 40, 44 to urge the ring 42 downward.

The ring pilot 42 is an elongated cylindrical member having three successive portions of increasing diameter with the lowermost portion having the greatest diameter and extending somewhat beyond the lowermost surface of the pre-stake punch and ring pilot holder 28. The uppermost portion 50 of the ring pilot is threaded and has a lock nut 52 mounted thereon which has successive portions of increasing diameter with the lowermost portion having the greatest diameter. The uppermost portion of the lock nut 52 is received within coil spring 44 to retain the coil spring in proper alignment with the ring pilot and the shoulder formed between the uppermost portion of lock nut 52 and the intermediate portion of lock nut 52 provides a surface which co-operates with spring 44 to urge the pilot assembly downward. The outside diameter of the lowermost portion of lock nut 52 is slightly less than the internal diameter of the upper portion of aperture 40 wherein the lock nut is slidably received within the upper portion of aperture 40. The etxernal diameter of the lowermost portion of lock nut 52 is greater than the internal diameter of the waisted portion of aperture 40 with the shoulder formed between the waisted portion of aperture 40 and the upper portion of aperture 40 co-operating with the lower surface of lock nut 52 to limit the downward movement of the ring pilot 42.

The intermediate portion 56 of the ring pilot 42 has an outer diameter substantially equal to but less than the internal diameter of the waisted portion of aperture 40 wherein the intermediate portion of the ring pilot 42 is slidably received within the waisted portion of aperture 40. An elongated vertically-extending keyway 58 is provided in the outer surface of intermediate portion 56 to prevent the ring pilot from rotating. The keyway 58 co-operates with a guide key 60 that is threadedly mounted in an aperture of the pre-stake punch and ring pilot holder 28 which extends perpendicular to the waisted midportion of aperture 40. The inner end of key guide 60 protrudes inwardly beyond the interior surface of the waisted midportion of aperture 40 and is slidably received within aperture 58 of the intermediate portion 56 of ring pilot 42. In this way, the proper alignment of the ring pilot is assured.

The lowermost portion 62 of ring pilot 42 has an external diameter substantially equal to the internal diameter of the lowermost portion of aperture 40 with the lowermost portion of the ring pilot being slidably received within the lowermost portion of aperture 40 and normally extending below the lower surface of pre-stake punch and ring pilot holder 28. The external diameter of the lowermost portion of the ring pilot 42 is greater than the internal diameter of the waisted portion of aperture 40 with the shoulder formed between the waisted midportion of aperture 40 and the lowermost portion of aperture 40 cooperating with the upper surface of the lowermost portion 62 of the ring pilot to limit the upward vertical movement of the ring pilot during the pre-staking operation. The external diameter of the lowermost portion 62 of the ring pilot 42 is substantially equal to but less than the internal diameter of the ring tab blank so that the ring pilot can pass partially through the ring tab blank as will be more fully explained hereinafter. In addition, the lowermost free end 64 of portion 62 is tapered inwardly so that the ring pilot 42 will enter the ring tab blank even if the ring tab blank is initially somewhat off center.

The external surface of portion 62 of the ring pilot is provided with a pair of diametrically opposed vertically-extending slots 66, 66' for retaining fingers 68, 68'. The uppermost end of slots 66, 66' each have enlarged cylindrical shaped portions 70, 70', for receiving hemispherical portions 72, 72' of fingers 68, 68'. Adjacent, but just above tapered portions 64 of ring pilot 42, aperture 74 for housing a coil spring 76 extends diametrically between slots 66, 66'. The longitudinal center line of aperture 74 extends perpendicular to a center line passing through the center of aperture 74 and the centers of the pre-stake and blank punches. The coil spring 76, which is housed within apertures 74, urges the lower portions of fingers 68, 68' outwardly beyond the external surface of portion 62 of the ring pilot 42 whereby the fingers 68, 68' frictionally engage the internal surface of a ring tab blank to retain the blank on the ring pilot during the pre-staking operation as will be more fully explained hereinafter.

Fingers 68, 68' have hemispherical upper portions 72, 72' which are received within the enlarged portions 70, 70' of slots 66, 66'. The hemispherical portions 72, 72' protrude inwardly farther than the inner planar surfaces 80, 80' of the lower portions of fingers 68, 68' thereby forming pivots between the upper portions 72, 72' of the fingers and the ring pilot. The outer surfaces of fingers 68, 68' have curvatures corresponding substantially to the curvature of the lower portion of aperture 40. The midportions 82, 82' of the outer surfaces extend vertically between midpoints of the hemispherical portions 72, 72' and collets 84, 84'. Collets 84, 84' are formed from pairs of intersecting outwardly inclined surfaces one of the surfaces extending outwardly from surfaces 82, 82' and the other surface extending outwardly from the free ends of fingers. The portions 86, 86' of the outer surfaces intermediate the midportions of hemispherical portions 72, 72' and the upper ends of the fingers are inclined inwardly from surfaces 82, 82' (e.g., five degrees) to permit the inward pivotal movement of the lower portions of the fingers during insertion of the ring pilot into a ring tab blank and the release of the ring tab blank from the ring pilot.

As is shown, fingers 68, 68' are retained in slots 66, 66' by hemispherical portions 72, 72' which prevent relative vertical movement between the fingers 68, 68' and the ring pilot and the internal cylindrical surface of aperture 40 which permits only limited lateral movement of the fingers relative to the ring pilot. Normally, surfaces 82, 82' contact the interior cylindrical surface of aperture 40 as the fingers 68, 68' are biased outwardly by means of spring 76. However, during the pivotal movement of fingers 68, 68' when the ring pilot is being inserted into or removed from a ring tab blank, the fingers pivot about the junctures of surfaces 82, 82' and surfaces 86, 86' with the inner pivotal movement of the fingers being limited by the contact of surfaces 86, 86' with the internal surface of aperture 40.

As shown in FIG. 4, the widths of the upper and lower portions of fingers 68, 68' are substantially equal to but less than the widths of the corresponding portions of slots 66, 66'. With this construction, the vertical alignment of fingers 68, 68' within slots 66, 66' is assured by the snug sliding fit formed between the sidewalls of fingers 68, 68' and the sidewalls of slots 66, 66'.

Figure 12:
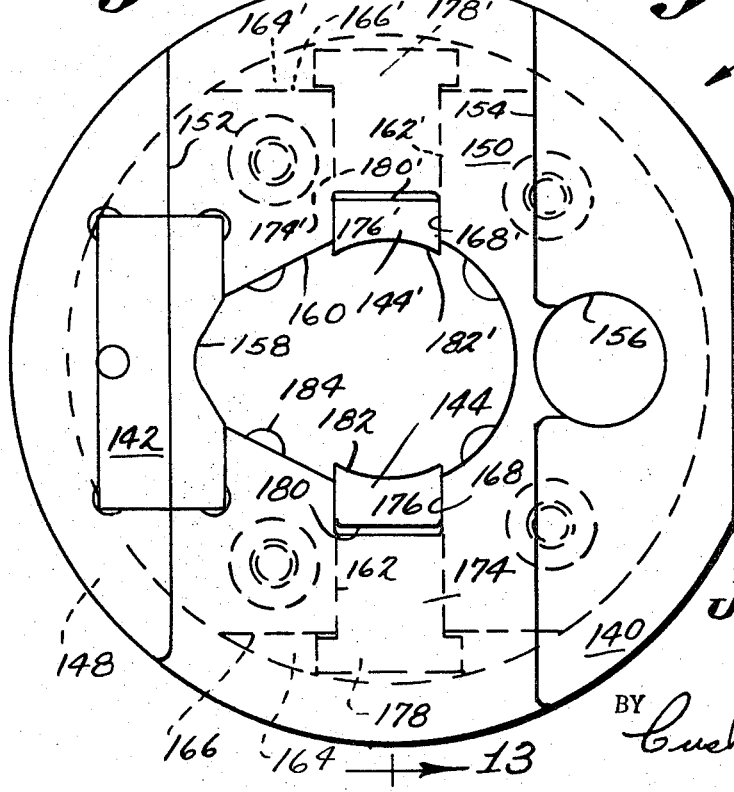
FIG. 12 is a top plan view of the intermediate blanking insert assembly.
Figure 10:
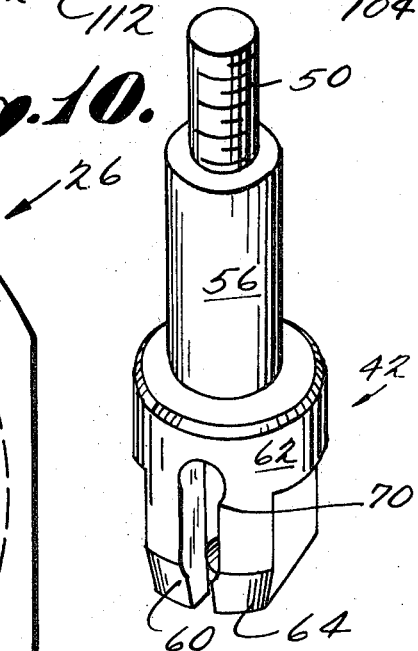
FIG. 10 is a perspective view of the ring pilot.

Pre-stake punch and ring pilot holder 28 is provided with a second vertical aperture 90 passing therethrough in which is mounted the pre-stake and blank punch assembly 92. Blank punch 94 is received within aperture 90 with the collar 96 which is positioned intermediate an annular flange 98 of the blank punch and a shoulder 100 of aperture 90 providing a means for supporting blank punch 94 and limiting the extent to which the blank punch extends below holder 28. As can be seen from FIGS. 5 and 12, the lower cross section of blank punch 94 is such that the outer peripheral edge 102 of the blank punch and the inner cutting edge of a cutting insert 142 on the intermediate blanking insert assembly 26 are complementary whereby when the blank punch passes down through the blank insert assembly 26, the ring tab blank is severed from the feed strip as will be more fully explained hereinafter. The interior surface 104 of the blank punch is adapted to conform to a ridge in the ring tab to help maintain the ring tab in proper alignment and, in addition, the interior surface 104 is cut away so as to allow sufficient room for the extension of the holder 28 which houses the ring pilot.

A pre-stake punch 106 and pre-stake bushing 108 are housed within blank punch 94. Pre-stake bushing 108 is an elongated hollow cylindrical element having an upper annular flange 110 and a lower terminal portion with an outwardly and upwardly inclined end wall 112. The lower terminal portion of pre-stake bushing 108 extends beyond the lower terminal portion of blank punch 94 with the abutment of annular flange 110 and shoulder 114 of the blank punch 94 limiting the extent to which the lower terminal portion of pre-stake bushing 108 extends below the blank punch 94.

Pre-stake punch 106 which is mounted in pre-stake bushing 108 is an elongated cylindrical element with an enlarged head portion 116 at its upper terminal end. The pre-stake punch 106 is slidably received within pre-stake bushing 108 with the lower terminal portion of the pre-stake punch being recessed within the pre-stake bushing.

Collar 118 and O-ring 120 are located intermediate annular flange 110 of the pre-stake bushing and the lower surface of head 116 on the pre-stake punch with the compression of the O-ring allowing limited vertical movement between the pre-stake bushing and pre-stake punch for adjustment purposes. A spacer 122 having a lower free end abutting the upper surface of head 116 and an inclined upper surface is slidably received within an upper portion of blank punch 94. With the horizontal movement of wedge member 124 (shown in cross section of FIG. 1) the spacer 122 and, consequently, pre-stake punch 106 is adjusted vertically with respect to the pre-stake bushing. This provides a means for adjusting the pre-stake punch after the pre-stake punch and ring pilot assemblies have been mounted on the upper die.

The blanking insert assembly 26 is carried on a support 130 which is affixed to the lower die assembly. The support 130 has a vertically-extending aperture 132 extending therethrough which has a should 134 formed therein for supporting the blanking insert assembly 26. In addition, a cover plate 136 is provided for retaining the blanking insert assembly in place. The cover plate 136 is secured to support 130 by bolt assemblies or other suitable means and extends diametrically inward beyond the sidewall of aperture 132. The configuration of the cover plate is such that the cover plate 136 does not interfere with the passage of the pre-stake punch and ring pilot assembly through the blanking insert assembly.

Blanking insert assembly 26 comprises a blanking insert 140, a cutting insert 142, fingers 144, 144' and a finger retaining plate 146. The outer sidewall of blanking insert 140 is provided with an annular shoulder 148 which abuts shoulder 134 of aperture 132 to position the blanking insert within the support 130. In addition, the outside diameter of the blanking insert below shoulder 148 is substantially equal to but less than the internal diameter of aperture 132 below shoulder 134 whereby the blanking insert is properly located and rigidly held in place within the support 130.

A guide way 150 having sidewalls 152, 154 extends across the upper surface of blanking insert 140. This guide way guides the ring tab blank feed strip through the pre-staking station with the transverse distance between sidewalls 152, 154 of guide way slot 150 being substantially equal to the width of the ring tab blank feed strip. In the preferred form of the invention, the longitudinal center line of the guide way slot 150 extends parallel to the aperture 74 extending through the ring pilot assembly.

Midway along guide way slot 150 an aperture 156 extends vertically through the blanking insert 140 and finger retaining plate 146. The diameter of aperture 156 is substantially equal to but greater than the diameter of finger 36 and the aperture is provided in the blanking insert and finger retaining plate to allow the passage of finger 36 through the blanking insert assembly 26. While in the preferred form of the invention, there are three fingers 36, no additional apertures are needed for the other two fingers since the vertical movement of these fingers occurs beyond the periphery of the blanking insert 140.

Midway along the opposite side of guide way slot 150, a cut-out portion is provided adjacent the location where the blank punch 94 passes through the blanking insert assembly 26. Within this cut-out portion, cutting insert 142 is mounted on the blanking insert 140 by bolt assemblies or other suitable fastener means. The cutting insert is substantially L-shaped in transverse cross section with the vertical surface of one arm of the cutting insert lying in the plane of sidewall 152 of guide way slot 150 and the upper horizontal surface of the other arm of the cutting insert lying in the same plane as the horizontal surface of the guide way slot 150 so that the cutting insert does not interfere with the passage of the feeds strip through the blanking insert assembly 26. The cutting insert 142 has a cutting edge 158 which overlaps an aperture 160 which extends vertically through blanking insert 140 and finger retaining plate 146. The concave surface of cutting edge 158 conforms to the contour of the convex cutting edge 102 of ring tab blank punch 94 whereby when the blank punch 94 passes down through the blanking insert assembly 26, the ring tab blank is severed from the feed strip along the only remaining score line joining the ring tab blank to the feed strip.

Aperture 160 has the same general configuration as the ring tab blanks with the internal dimensions of the aperture 160 being greater than the corresponding external dimensions on the ring tab blanks which pass through aperture 160. A pair of diametrically opposed solts 162, 162' having center lines extending parallel to the longitudinal center line of guide way slot 150 are provided in the underside of blanking insert 140. In addition, the underside of blanking insert 140 has cut-away portions 164, 164' forming vertical surfaces 166, 166' that extend perpendicular to the center line of slots 162, 162' with the vertical surfaces being interrupted by slots 162, 162'. A pair of vertical slots 168, 168' which are aligned with and intersect slots 162, 162' are provided along the vertical surface of aperture 160. A pair of holes 170, 170' having center lines extending parallel to the center line of slots 162, 162' are provided in the faces of vertical slots 168, 168'. Coil springs 172, 172' are retained within the recesses 170, 170' for the purpose of urging fingers 144, 144' inwardly into engagement with the outer periphery of a ring tab blank.

Fingers 144. 144' are substantially L-shaped in vertical longitudinal cross section and have horizontal and vertical arms 174, 174' and 176, 176' respectively which are slidably received within slots 162, 162' and 168, 168' respectively. The outer terminal portions of horizontal arms 174, 174' have a pair of flanges 178, 178' which co-operate with surfaces 166, 166' to limit the inward travel of the fingers 144, 144' as they are biased inwardly by springs 172, 172'. The rear faces 180, 180' of vertical arms 176, 176' co-operate with the faces of slots 168, 168' to limit the outward movement of the fingers as they are pushed out of the way by the passage of the ring tab blank through the blanking insert assembly during the pre-staking operation. As can be seen from the spacing between surfaces 180, 180' and the vertical surfaces of slot 168, 168' in FIG. 12, the distance between the inner surfaces of flanges 178, 178' and the vertical surfaces 180, 180' on fingers 144, 144' is greater than the distance between surfaces 166, 166' and the faces of slots 168, 168' on the blanking insert 140 to permit relative movement between the fingers and the blanking insert.

The inner faces 182, 182' on fingers 144, 144' are concave, have their upper edges rounded off to facilitate passage of a ring tab blank between the fingers, and normally the surfaces extend inwardly beyond the vertical sidewall of slot 160 so that the fingers 144, 144' frictionally grip and provide a backing means for the ring tab blanks when the ring pilot 42 is initially inserted into the ring tab blanks. The fingers 144, 144' along with bosses 184 on the sidewall of aperture 160 further insure that the ring tab blanks are properly aligned for the pre-staking operation.

The fingers 144, 144' are retained within slots 162, 162', 168, 168' by means of finger retaining plate 146 which is secured to the underside of blanking insert 140 by bolt assembly 186 or equivalent fastening means. As indicated above, the finger retaining plate 146 is provided with apertures corresponding to apertures 156, 160 in blanking insert 140 so that the finger retaining plate does not interfere with the passage of the ring tab blank or upper die assembly through the blanking insert assembly 26.

The lower die assembly 24 comprises a pre-stake punch assembly 190 and an annular work support 192. Pre-stake punch 194 of the pre-stake punch assembly is an elongated cylindrical element which is housed within pre-stake punch bushing 196. The pre-stake punch bushing and the pre-stake punch are rigidly affixed to the lower die assembly 24 by a sleeve 198 which is secured to the lower die assembly 24 by bolt and pin assemblies 200, 202. Sleeve 198 encircles the upper portion of the pre-stake punch bushing 196 with the bolt assemblies 202 maintaining the bushing 196 and, consequently, pre-stake punch 194 in position by the downward pressure exerted on the annular flange of bushing 196 by sleeve 198.

The upper end face of bushing 196 is tapered with the pre-stake punch 194 protruding beyond the upper surface of the bushing so that the lower pre-stake punch 194 will co-operate with the upper pre-stake punch 106 during the pre-staking operation without bushing 196 interfering with the uniting of the ring tab blank to the can top or end closure. The upper surface of sleeve 198 normally lies in substantially the same plane as the uppermost surface of bushing 196 so that sleeve 198 will not interfere with the pre-staking operation.

The annular floating work support 192 is slidably received about sleeve 198. The annular member 192 is urged upward by a plurality of coil springs 204 which are received within recesses in the lower die assembly 24 and the lower end face of the annular work support. In addition, a peripheral flange 206 encircles the lower edge of the annular work support 192. The flange 206 co-operates with an annular shoulder 208 formed on the lower die assembly to limit the upward movement of the annular work support. The coil springs 204 and the peripheral flange 206 insure that the upper surface 210 of the annular work support is normally co-planar with the lower plane of the end closure feed means 212 so that when an end closure 214 is indexed into positon at the pre-staking station, the end closure will rest on the annular work support. During the pre-staking operation, as pressure is applied on the end closure by the fingers 36 and the upper pre-stake punch 106, the annular work support 192 is forced downward against the pressure of coil springs 204 until the upper surface 210 of the annular work support is below the upper surface of bushing 196 and substantially co-planar with the upper surface of sleeve 198 which also moves vertically due to the compressible shock absorbing spacers 216. In this way, the lower pre-stake punch 194 comes into operative relation with the upper pre-stake punch 106 and the ring tab blank 218 is affixed to the end closure 214.

Referring now to FIGS. 14 and 15, a modified form 230 of the pre-staking punch and ring pilot assembly is illustrated having a housing 232 which is mounted on the upper die assembly 22 in the same manner as housing 28 of the first form of the invention. The modified pre-staking punch and ring tab assembly 230, in most respects, cooperates with the other components of the upper and lower dies and the blanking insert in the same manner as the first form of the invention. Therefore, to avoid unnecessary repetition, only the distinguishing factors of the two forms of the invention will be discussed in detail.

As shown in FIG. 14, pilot 234 is identical in configuration to ring pilot 42 with the exception that the lowermost portion 236 of the ring pilot which normally extends beyond the lower end face of the housing is not provided with spring-biased fingers such as fingers 68, 68' of the first form of the invention. However, as in the first form of the invention, the lower portion 236 of the ring pilot is usually cylindrical with a tapered surface 238 to facilitate the entry of the pilot into the ring portion of the pull tab blank. The cross-sectioinal configuration of the lower portion 236 of the ring pilot need not be circular but can be semi-round or otherwise shaped as required for gripping the particular ring tab blanks being pre-staked to the end closure. The ring pilot is spring-loaded by means of a coil spring 239 and is slidably received within the housing whereby the pilot can be moved from the extended position, shown in FIG. 14 when a blank is being severed from the feed strip and positioned for pre-staking, to a depressed position such as that shown in FIG. 15 to release the ring pilot 234 from the ring tab blank 218 once the blank has been positioned.

The pre-staking punch assembly 240 comprises staking punch 242, pre-stake punch bushing 244, and blank punch 246 which are mounted within an aperture of the pre-stake punch and ring pilot assembly 230. However, unlike the first form of the invention, the staking punch 242 normally extends below pre-stake punch bushing 244 and is spring-loaded by means of a spring 248 interposed between the head of the staking punch and spacer 250. The upward limit of travel of the staking punch 242 can be adjusted by wedge 124 of upper die 22 which engages spacer 250 and can move the spaced 250 relative to the head of the staking punch to adjust the initial spring pressure and thereby the extent to which the staking punch can be depressed into bushing 244 before the force exerted by spring 248 equals the forces exerted on the lower end of the punch. With this construction, a ring tab blank 218 is frictionally retained on the pre-staking punch and ring pilot assembly by the protrusion of portion 236 of the ring pilot through the ring portion of the pull tab blank along with the protrusion of staking punch 242 through the aperture 220 in the attachment portion of the ring tab blank.

Pressure applied to the underside of the staking punch 242 by the end closure rivet or other means can depress the staking punch into the pre-stake punch bushing 244 to the position substantially as shown in FIG. 15 wherein the staking punch is released from the ring tab blank. At the position shown in FIG. 15, upward movement of staking punch 242 ceases and the deformation of the rivet on the end closure between the staking punches 242, 194 of the upper and lower assemblies takes place.

OPERATION

In operation, with the upper die assembly 22 in its uppermost position, a ring tab blank 218 is indexed into position in the blanking insert assembly 26 and an end closure 214 is indexed into position so as to rest on the annular work support 192. The upper die is then lowered with fingers 36 passing through aperture 156 or outside the blanking insert assembly.

In the first form of the invention, as the upper die assembly 22 passes through the blanking insert 140, the ring pilot 42 is received within the aperture in the ring tab blank 218 with the tapered surfaces on the lower portion of the ring pilot 42 and the ring pilot fingers 68, 68' facilitating the entrance of the ring pilot into the ring tab blank. At the same time, fingers 144, 144' of the blanking insert 140 frictionally engage the outer periphery of the ring tab blank adjacent the point on the inner surface of the ring tab blank where the fingers 68, 68' of the ring pilot 42 grip the ring tab blank. The frictional engagement of the ring tab blank 218 by fingers 144, 144' maintains the ring tab blank in position while the ring pilot 42 descends through the insert to the point where the ring tab blank has passed over the collets 84, 84' of the ring pilot fingers and is firmly retained on the ring pilot by means of the outwardly biased ring pilot fingers 68, 68'. As the ring pilot and ring tab blank continue to descend through the blanking insert assembly 26, fingers 144, 144' are urged outwardly against the spring 172, 172' thereby allowing the ring tab blank to pass through the blanking insert 140.

As the upper die descends through the blanking insert assembly, the cutting edge 102 of blank punch 94 cooperates with the cutting edge 158 of cutting insert 142 in the blanking insert assembly to sever the ring tab blank from the feed strip (the ring tab blank having been secured to the feed strip only along the end severed by the two cutting edges).

The upper die assembly 22 continues to descend until the fingers 36 engage the end closure 214 adjacent the peripheral inverted U-shaped flange on the end closure. The inclined surfaces 38 of the fingers facilitate the entry of the fingers past the peripheral flange of the end closure and as the fingers descend within the end closure, the outwardly inclined surfaces 38 of the fingers tend to center the end closure with regard to the upper and lower pre-stake punches. As the upper die continues its descent, the annular work support 192 descends against the pressure of coil springs 204 due to the pressure exerted by finger 36 and the ring pilot 42. When the ring tab blank 218 (which is firmly held in position by the ring pilot assembly 42) engages the upper surface of the end closure 214, the rivet 222 on the end closure extends through the aperture 220 on the securing extension of the ring tab and the ring tab is centered between the upper and lower pre-staking punches 106, 194. As the upper die continues its downward movement, the lower pre-stake punch 194 extends into the rivet 222 which is located in the center portion of the end closure and the rivet in turn protrudes upwardly through the aperture 220 provided in the ring tab blank and into the pre-stake punch bushing 108 where the upper pre-stake punch 106 contacts the upper surface of the rivet thereby initiating the deformation of the rivet between the punches 106, 194. The pull tab blank 218 is forced against the pre-stake punch bushing 108 by the end closure 214 thereby forcing the pre-stake punch bushing upward a limited extent relative to the pre-stake punch 106 due to the compression of O-ring 118. As shown in FIG. 16, the upward movement of the pre-stake punch bushing 108 relative to pre-stake punch 106 is arrested when the lower end faces of the punch 106 and bushing 108 are substantially co-planar wherein the bushing 108 aids in the deformation of the rivet and allows the outward radial flow of the deformed material in the rivet to form a head, thus pre-staking the ring tab blank to the end closure 214.

After the ring pilot 42 contacts the upper surface of end closure 214, the upward pressure on the ring pilot increases as the upper die continues to descend. With the increasing pressure on the lower end of the ring pilot, the ring pilot assembly is forced upward relative to the pre-stake punch and ring pilot holder 28 with the lower terminal portion 62 of the ring pilot sliding up into the lower portion of aperture 40. As the lower portion 62 slides up into aperture 40, the ring pilot fingers 68, 68' are forced inwardly by the camming action of the collets and the ring tab blank is forced over the collets and off the ring pilot by the lower end face of the pre-stake punch and ring pilot housing 28. With the retraction of the upper die assembly 22, the ring tab blank has been affixed to the end closure and the assembly is ready to commence the next cycle.

In the modified form of the invention, as the upper die assembly 22 passes through the blanking insert 140, the lower portion 236 of the ring pilot 234 is received within the ring portion of the ring tab blank 218 with the tapered surface 238 on the lower portion of the ring pilot facilitating the entrance of the ring pilot into the ring tab blank. At the same time, the staking punch 242 passes through the aperture 220 in the blank that is provided for the rivet 222 of the end closure whereby the ring pilot in conjunction with the prestaking punch frictionally retains the ring tab blank 218 in place while the blank is being severed from the feed strip and positioned for the pre-staking of the blank to the end closure.

The frictional engagement of the ring tab blank 218 by fingers 144, 144' maintains the ring tab blank in position (permitting only a limited deflection of the blank as shown in FIG. 14) while the ring pilot 234 and staking punch 242 pass through the aperture in the ring portion and aperture 220 respectively. However, as the ring pilot and pre-staking punch assembly 230 continues to descend through the blanking insert assembly 26, fingers 144, 144' are urged outwardly against springs 172, 172' thereby allowing the ring tab blank to pass through the blanking insert 140.

With the descent of the pre-stake punch and ring pilot assembly through the blanking insert assembly, the cutting edge 252 of the blank punch 246 cooperates with the complementary cutting edge 158 of the cutting insert 142 and the blanking insert assembly to sever the ring tab blank from the feed strip. After passing through the blanking insert assembly 26, the pre-stake punch and ring pilot assembly continues to descend until fingers 36 engage the end closure 214 adjacent the peripheral inverted U-shaped flange on the end closure to position and hold the end closure in place for the pre-staking operation. As the upper die continues to descend, the annular work support 192 descends against the pressure of coil springs 204 due to the pressure exerted by fingers 36 and ring pilot 234.

When the ring tab blank 218 engages the upper surface of the end closure 214, the rivet 222 on the end closure 214 passes up through aperture 220 thereby depressing the pre-stake punch 242 within the pre-stake punch bushing 244 while at the same time, the ring pilot 234 is being depressed into its sleeve by the upper surface of the end closure. The passage of the rivet through the aperture 220 releases the upper staking punch 242 from the ring tab blank 218 and when the upward movement of the upper pre-staking punch 242 is arrested by the downward pressure of spring 248, the deformation of the upper surface of the rivet 222 is initiated between the upper and lower pre-staking punches 242, 194. As the upper die continues to descend, the pull tab blank 218 is forced against the pre-stake bushing 244 by the end closure 214 thereby forcing the pre-stake punch bushing upward a limited extent relative to the pre-stake punch 106, during the initial deformation of the rivet 222, until the force exerted on bushing 244 by O-ring 254 equals the upward forces on the pre-stake punch bushing 244. As shown in FIG. 16, the upward movement of the pre-stake punch bushing 244 relative to pre-stake punch 242 is arrested when the lower end faces of these elements are substantially co-planar wherein the bushing 244 aids in the deformation of the rivet and allows the outward radial flow of the deformed material in the rivet to form a head, thus pre-staking the ring tab blank 218 to the end closure 214.

While the pre-staking is taking place, the descent of the pre-stake punch and ring pilot assembly relative to the end closure causes the continued depression of the ring pilot 234 into housing 232 until the ring pilot is released from the pull tab blank. With the blank now pre-staked or riveted to the end closure, upon the retraction of the upper die assembly 22 to its initial position, the next operating cycle can commence.

Having now described the preferred embodiment of the ring tab assembly and the preferred method of operation of the assembly, it will be apparent that various modifications and equivalents can be resorted to without departing from either the spirit or scope of the invention.

What is claimed is:

1. A mechanical holding and positioning device for use with ring tabs and the like comprising:
    ring pilot means adapted to be mounted in a die assembly means; and
    spring-biased finger means for gripping a ring tab, said spring-biased finger means carried by said ring pilot means.

2. In the mechanical holding and positioning device of claim 1: said spring-biased finger means having collet means thereon for retaining a ring tab on said ring pilot means.

3. In the mechanical holding and positioning device of claim 1: said ring pilot means having an outer surface with a curvature conforming to the curvature of an aperture within a ring tab.

4. In the mechanical holding and positioning device of claim 1:
    said ring pilot means having an outer surface with a curvature conforming to the curvature of an aperture in a ring tab and said ring pilot means having a plurality of slots in said outer surface for receiving said spring-biased finger means; and
    said spring-bised finger means being carried within said plurality of slots.

5. In the mechanical holding and positioning device of claim 4: said spring-biased finger means having collet means thereon for retaining a ring tab on said ring pilot means.

6. In the mechanical holding and positioning device of claim 1:
    said ring pilot means having an outer surface with a curvature conforming in configuration to an aperture in a ring tab, said ring pilot means having a pair of diametrically opposed, vertically-extending slots in said outer surface for receiving said spring-biased finger means and said ring pilot means having an aperture therein extending between said slots for receiving a spring;

spring-biased finger means carried within said vertically-extending slots; and spring means within said aperture engaging said spring-biased finger means.

7. In the mechanical holding and positioning device of claim 6: each of said vertically-extending slots having an enlarged uppermost portion for receiving enlarged portions of said spring-biased finger means.

8. In the mechanical holding and positioning device of claim 7: said spring-biased finger means having collet means thereon for retaining a ring tab on said pilot means.

9. In the mechanical holding and positioning device of claim 8: said spring-biased finger means having enlarged uppermost portions which are carried within the uppermost portions of said slots, said enlarged uppermost portions having substantially hemispherical inner surfaces to facilitate pivotal movement of said spring-biased finger means relative to said ring pilot means.

10. In the mechanical holding and positioning device of claim 9: said spring-biased finger means having inwardly inclined surfaces extending from midpoints of said hemispherical portions to the upper ends of said spring-biased finger means to permit relative pivotal movement of said spring finger means relative to said ring pilot.

11. A mechanical holding and positioning assembly for use with ring tabs and the like comprising:

die assembly means having a sleeve portion therein;

ring pilot means carried within said sleeve portion of said die assembly means, said ring pilot means having a portion for engaging ring tabs, said portion of said ring pilot means normally projecting beyond an end of said sleeve portion of said die assembly means; and spring-biased finger means for griping a ring tab, said spring-biased finger means carried by said ring pilot means and said spring-biased finger means having portions normally extending beyond said end of said sleeve portion of said die assembly.

12. In the mechanical holding and positioning assembly of claim 11:

said ring pilot means having an outer surface with a curvature conforming to the curvature of said sleeve portion and said ring pilot means being slidably carried in said sleeve portion; and said spring-biased finger means normally projecting beyond said outer surface of said ring pilot means whereby movement of said ring pilot means into said sleeve causes said spring-biased finger means to be forced inwardly to effect the release of a ring tab from the ring pilot means.

13. In the mechanical holding and positioning assembly of claim 12: said spring-biased finger means having collets thereon which co-operate with the interior surface of said sleeve to urge the fingers inwardly.

14. In the mechanical holding and positioning assembly of claim 11:

said ring pilot means having an outer surface with a curvature conforming to the curvature of an internal surface of said sleeve portion, said ring pilot means being slidably carried within said sleeve portion and said ring pilot means having a pair of diametrically opposed slots in said outer surface for receiving said spring-biased finger means; and said spring-biased finger means being carried within said pair of diametrically opposed slots and normally projecting outwardly beyond said outer surface of said ring pilot means with movement of said ring pilot means into said sleeve causing said spring-biased fingers to be forced inwardly to effect the release of a ring tab.

15. A mechanical holding and positioning assembly for locating ring tabs on an end closure and holding the ring tabs in place during securement of the ring tabs to the end closure, comprising:

ring pilot means carried by a die assembly means;

spring-biased ring pilot finger means for gripping a ring tab, said spring-biased ring pilot finger means carried by said ring pilot means;

insert assembly means, said insert assembly means having means for temporarily holding a ring tab in position while said ring pilot means is inserted into the ring tab.

16. In the mechanical holding and positioning assembly of claim 15: said means for temporarily holding the ring tab comprising spring-biased finger means for gripping a peripheral surface of the ring tab.

17. In the mechanical holding and positioning assembly of claim 16: said spring-biased finger means for temporarily holding the ring tab comprising a pair of opposed, inwardly-biased fingers extending inwardly beyond a sidewall of an aperture within said insert assembly means, said fingers being forced out of the way by the ring tab after said ring pilot means has been inserted into said ring tab and as said ring pilot with said ring tab passes through said aperture in said insert assembly means.

18. In the mechanical holding and positioning assembly of claim 17: said insert assembly means having a cutting means for co-operating with a ring tab punch on said die assembly means to sever the ring tab from a feed strip.

19. An insert assembly for use in combination with a mechanical holding and positioning device for gripping ring tabs and the like comprising:

guide way means for guiding a feed strip of ring tabs, said guide way means having an aperture therein for passage of a ring tab through said insert assembly after the ring tab has been severed from said feed strip;

spring-biased finger means for temporarily retaining a ring tab in position while a ring pilot of the mechanical holding device is inserted through the ring tab, said spring-biased finger means being forced out of the way by the ring tab after said ring tab has been gripped by said mechanical holding device to permit passage of said ring tab and holding device through said aperture in said insert assembly for securement of the ring tab to an end closure.

20. A mechanical holding and positioning assembly for use with ring tabs and the like comprising:

ring pilot means adapted to be mounted in a die assembly means, said ring pilot means having a portion for protruding through a first aperture in a ring tab and frictionally engaging the inner edge of an annular portion of said ring pull tab surrounding said aperture; and a pin means carried by said assembly adjacent said ring pilot means for protruding through a second aperture in said ring tab and frictionally engaging said ring tab about the edge of said second aperture whereby said ring tab is frictionally retained on said ring pilot means and said pin means.

21. In the mechanical holding and positioning assembly of claim 20: said ring pilot means being slidably carried within a sleeve of said assembly and being spring-loaded with said ring tab engaging portion normally projecting beyond an end of said sleeve portion whereby said ring pilot means can be moved from an extended ring tab engaging position to a depressed position for releasing said ring pilot means from said ring tab.

22. In the mechanical holding and positioning assembly of claim 21: said pin means being spring-loaded and slidably carried within a sleeve means with a portion of said pin means normally extending beyond said sleeve means for engaging said ring tab, said pin means being movable from an extended ring tab engaging position to a depressed position for releasing said pin from a ring tab.

23. In the mechanical holding and positioning assembly of claim 20: said pin means being spring-loaded and slidably carried within a sleeve means with a portion of said pin means normally extending beyond said sleeve means for engaging said ring tab, said pin means being movable from an extended ring tab engaging position to a depressed position for releasing said pin from a ring tab.

24. In the mechanical holding and positioning assembly of claim 23: said pin means being a punch and said sleeve means being a punch bushing for cooperating with an opposed punch to deform a rivet on an end closure which passes through said second aperture to secure said ring tab to said end closure.

25. A mechanical holding and positioning assembly for locating ring tabs on an end closure and holding the ring tabs in place during securement of the ring tabs to the end closure comprising:

ring pilot means carried by a die assembly means, said ring pilot means adapted to protrude through a first aperture in a ring tab to frictionally engage the inner edge of an annular portion of said ring tab surrounding said aperture;

pin means carried by said assembly adjacent said ring pilot means for protruding into a second aperture in said ring tab and frictionally engaging the ring tab about the edge of said aperture whereby the ring tab is frictionally retained on said ring pilot means and said pin means; and insert assembly means, said insert assembly means having means for temporarily holding a ring tab in position while said ring pilot means and said pin means are inserted through said ring tab.

26. In the mechanical holding and positioning assembly of claim 25: said means for temporarily holding said ring tab comprising spring-biased finger means for gripping a peripheral surface of said ring tab.

27. An assembly for securing a ring tab to an end closure comprising:

an upper die assembly, a lower die assembly and an insert assembly located between said upper and lower die assemblies;

said upper die assembly having a mechanical holding and positioning means for transferring a ring tab from said insert assembly to an end closure supported on said lower die assembly and positioning said ring tab on said end closure between opposed punches on said upper and lower die assemblies whereby said opposed punches deform a rivet on said end closure which protrudes through a first aperture in said ring tab to secure said ring tab to said end closure.

28. In the assembly of claim 27: said mechanical holding and positioning means having a ring pilot means, said ring pilot means having a portion for protruding through a second aperture in said ring tab and frictionally engaging the inner edge of an annular portion of said pull tab surrounding said aperture.

29. In the assembly of claim 28: said ring pilot means being slidably carried within a sleeve of said upper die assembly and being spring-loaded with said ring tab engaging portion normally projecting beyond an end of said sleeve portion whereby said ring pilot means can be moved from an extended ring tab engaging position to a depressed position for releasing said ring pilot means from said ring tab.

30. In the assembly of claim 28: said ring pilot means having spring-biased finger means thereon for gripping a ring tab.

31. In the assembly of claim 28: said mechanical holding and positioning means having a pin means carried by said mechanical holding and positioning means adjacent said ring pilot means, said pin means for passing through a second aperture in said ring tab and frictionally engaging said ring tab about the edge of said first aperture whereby said ring tab is frictionally retained on said ring pilot means and said pin means.

32. In the assembly of claim 28: said insert assembly means having means for temporarily holding a ring tab in position while said ring pilot means is inserted through said ring tab.

References Cited

UNITED STATES PATENTS

| | | | |
|---|---|---|---|
| 1,201,539 | 10/1916 | Arey | 113—1 |
| 2,160,374 | 5/1939 | Veillette | 29—200 |
| 2,659,406 | 11/1953 | Locke | 29—203X |
| 3,216,758 | 11/1965 | Bohlen | 29—432X |
| 3,276,112 | 10/1966 | Tantlinger et al. | 113—116X |

THOMAS H. EAGER, Primary Examiner

U.S. Cl. X.R.

29—208, 432; 113—1, 116